United States Patent [19]

Colvin et al.

[11] 3,933,643
[45] Jan. 20, 1976

[54] ELECTRICALLY CONDUCTING FILTER MEDIA FOR FLUIDS

[75] Inventors: Floyd E. Colvin, Tell City; John R. Mummert, Indianapolis; Franklin George Gilbert, Lebanon, all of Ind.

[73] Assignee: The Carborundum Company, Niagara Falls, N.Y.

[22] Filed: Sept. 10, 1971

[21] Appl. No.: 179,399

[52] U.S. Cl. ............ 210/243; 55/358; 55/498; 55/527; 210/504; 210/508
[51] Int. Cl.² .......................................... B01D 35/06
[58] Field of Search ............ 55/524, 522, 387, 389, 55/74, 75, 138, 358, 498, 527; 209/127; 210/243, 223, 503, 504, 505, 506, 507, 508

[56] References Cited
UNITED STATES PATENTS

| | | | |
|---|---|---|---|
| 2,428,329 | 9/1947 | Ham et al. | 210/243 X |
| 2,893,561 | 7/1959 | Duzich | 210/223 |
| 3,015,367 | 1/1962 | Smith et al. | 55/524 |
| 3,289,392 | 12/1966 | Fowler | 55/138 |
| 3,398,082 | 8/1968 | Lochmann et al. | 210/223 X |
| 3,463,168 | 8/1969 | Troll et al. | 55/522 X |
| 3,477,210 | 11/1969 | Herrert | 55/387 |
| 3,544,458 | 12/1970 | Sato | 210/243 |
| 3,567,619 | 3/1971 | Brown | 210/243 |
| R18,967 | 10/1933 | Brandt | 210/243 |

FOREIGN PATENTS OR APPLICATIONS

| | | | |
|---|---|---|---|
| 143,731 | 11/1961 | U.S.S.R. | 210/243 |

*Primary Examiner*—Theodore A. Granger
*Attorney, Agent, or Firm*—David E. Dougherty

[57] ABSTRACT

Conductive filter elements are made by treating non-conductive fibrous materials such as inorganic or organic fibers with resins containing finely divided carbon. The treated fibers are then fabricated into filter elements which are electrically conductive throughout. Strands of roving or yarn which are nonconductive may be joined by twisting together with strands of conductive roving or yarn to give conductivity to the finished multiple strand. Conductive filter elements are also made from extruded fibers which are filled with carbonaceous material during extrusion. These elements permit grounding of static electrical potential which would otherwise accumulate in a nonconductive element. If desired, a controlled low potential direct or alternating electrical charge can be maintained on the filter element to enhance the separation of particles of opposite charge. Particulate filter media, such as that used in filter beds, may also be treated with carbon to form an electrically conductive filter mass.

12 Claims, 13 Drawing Figures

INVENTOR.
FLOYD COLVIN
BY JOHN MUMMERT
FRANKLIN GILBERT ic ELECTRICALLY CONDUCTING FILTER MEDIA
FOR FLUIDS

BACKGROUND OF THE INVENTION

Fluid filtration is a well-known industrial operation. Many different types of filter apparatus have been developed, ranging from units for separation of relatively coarse particles from a fluid stream down to the removal of sub-micron particles. All types of filter media have been used, having varying degrees of effectiveness depending on the type of fluid being processed and the kind of particle being removed. The filtration operation is basically simple, being essentially a straining and size separation procedure. In many cases the rate of filtration is a complicating factor, so that a filter which is effective at a given fluid flow rate may quickly become ineffective when flow rates are increased. Fluid composition may also give rise to undesirable effects. Fluids of high purity may have such resistance to the conductance of electricity that a static charge is built up within the fluid from the action of flowing through piping or similar conduits. Nonconductive filters with their multiplicity of orifices or pores break up the fluids into very small portions, resulting in the accumulation of the static charge on the nonconductive filter media. When this potential is sufficiently high, a spark may jump to a surface of lower potential with the possibility of either igniting the fluid, if a flammable liquid or gas, or causing an explosion if the fluid is a suspension of dust in air, for example.

In some cases a low potential charge on a filter medium may be beneficial, especially if the charge is of opposite polarity to that of the particles being separated. In this case, the electrical attraction of the filter medium for the particles enhances filter action. This type of charge may be supplied from a controlled external source of direct current and requires a filter media with electrical conductance.

A number of patent references describe filters in which the formation of a static charge is relied on to enhance filter efficiency. In U.S. Pat. No. 2,612,966 to W. H. Nicol, a filter medium of polyethylene fibers is disclosed for air filtration, passage of the air building up an electrostatic charge which removes dust particles. The filter medium is nonconductive and the static charges are of uncontrolled potential. Other patents, such as U.S. Pat. No. 2,724,457 to C. S. Besser and U.S. Pat. No. 2,795,290 to P. V. Bertsch, disclosed similar types of filters. A U.S. Pat. No. 2,992,700 to L. Silverman discloses a fluidized bed of plastic spheres which build up static charges during filtration. In U.S. 3,186,551 issued to A. Dornauf, a filtering method for jet fuel is described which indicates a conductive connection between two metal end caps and the center core of the filter cartridge to remove static electricity. This is a primitive method and does not envision the presence of static electricity throughout the fluid which does not conduct away easily. A patent issued to D. Zulauf (U.S. Pat. No. 3,446,906) describes a metal plated plastic foam sheet material which would be more effective for static charge removal, no mention is made of fibers or conductive materials other than metals. In U.S. Pat. No. 2,684,126, issued to D. I. Doyle, the hazard of dust explosion by static electrical discharge is cited and a grounded copper wire screen insert for a filter bag is disclosed.

From a consideration of the prior art, it appears desirable to have some type of electrical charge on the filter media, especially for applications in which very small particles are to be removed from the fluid stream. Static electricity is generated at relatively high potentials and none of the prior art devices seem to have any way of regulating this potential. There is probably little hazard for small filters handling low volumes of fluid at relatively low velocities such as domestic vacuum or furnace air cleaners. In larger scale operations, however, large volumes of fluid are handled at high velocities and the amounts of flammable liquids or explosive-prone particle and gas mixtures present a serious fire or explosion hazard. The control of electrical charges on filter media is important; therefore, an object of the present invention is to provide filter media which have conductive properties which permit removal of dangerous static electrical potentials from fluid streams. A further object of the invention is the provision of filter media which will allow the establishment of a controlled low voltage potential on the media to aid particle separation while avoiding the hazards of a high potential discharge from the filter media into the filter fluid.

SUMMARY OF THE INVENTION

The invention discloses a porous, resilient, electrically conductive filter element comprising a body of permeable material sufficiently porous to allow the passage of fluid through the body. The filter element comprises carbonaceous conductive material for conducting and dissipating static electrical charges accumulating in the element during fluid passage. As a modification, the filter element may be connected to an external power supply suitable for maintaining a controlled uniform electrical potential across the filter media to assist in the retention of particles of opposite charge during filtration. Filter beds of particulate materials may also be provided with conductive carbonaceoue material dispersed thereon for conducting electrical charges throughout the filter element during fluid passage. The filter bed may either be grounded or may be insulated to permit a controlled electrical potential on the filter media.

DESCRIPTION OF THE INVENTION

Units for fluid filtration are commonly made from fibers which can be either inorganic, such as alumina, silica, glass or asbestos fiber or made from organic polymers such as nylon, Dacron, polyethylene or polypropylene, or resins such as phenolic, vinyl chloride or melamine. Animal or vegetable fibers, such as wool or cotton, may also be used. These materials may be blended if desired and formed into filter elements by well-known methods such as winding, felting, needling, flocculating, etc., the elements usually being held in place by the application of appropriate binders which are applied to the filter materials during filter fabrication. These methods and materials result in filter elements that have relatively nonconductive structures and which may permit the accumulation of undesirable static electrical potentials during operation. This is prevented in the filter element of the invention by applying a coating of carbon to the surface of the filter materials during their fabrication. The term "carbon", as used in this description, includes all forms of electrically conductive carbon commercially available and in which the carbon may be partially or completely in the graphitized form. The carbon may be applied to the filter material by mixing finely divided carbon with the binder which is applied to the filter element during manufacture, thus distributing the carbon throughout the element and forming conductive surfaces therein.

Where a synthetic fiber, such as viscose rayon or cellulose acetate rayon, is made by extrusion from a resin mixture, the carbon may be included in the mixture. The extruded fiber then contains the carbon internally and may be made into conductive filter elements with or without binders as desired. In another method of manufacture, nonconductive fibers may be blended with carbon fibers and then fabricated into conductive filter elements.

Figure 1:
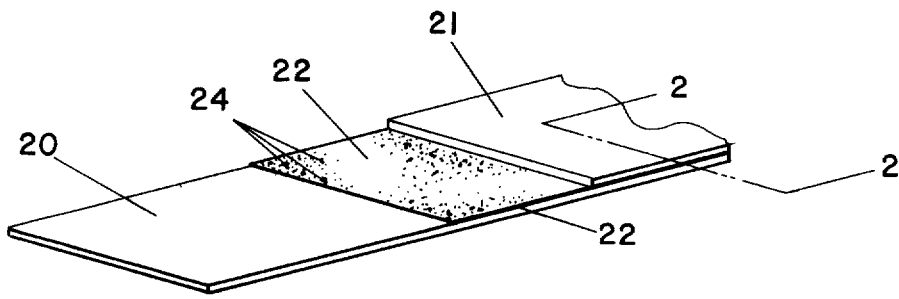
FIG. 1 is a perspective view of a sandwich construction having two sheets of porous fibrous material with conducting particles of conductive carbon disposed between the sheets.

One type of filter element construction is shown in FIG. 1 in which two sheets of porous fibrous material 20 and 21 are assembled in a sandwich fashion, enclosing between them a layer of bonding resin 22 containing carbon particles or fibers 24, the particles or fibers being so disposed as to furnish an electrically conductive path through the resin layer. The porous fiber sheets 20 and 21 may be formed of various fibers such as wood fibers, cotton linters or wool, as well as inorganic fibers made from alumina, silica, glass or asbestos. Synthetic fibers of Nylon, Dacron, polyethylene or polypropylene may be used, also fibers drawn from phenolic, melamine or vinyl chloride resins. These materials may be blended, if desired, and the fibers may be water-laid or air-laid to form a sheet or batt. A cross section of the filter element is shown in FIG. 2.

Figure 2:
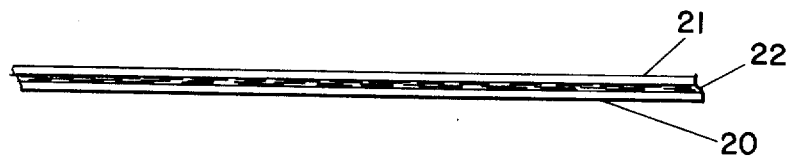
FIG. 2 is a sectional view taken on the line 2–2 of FIG. 1.
Figure 3:
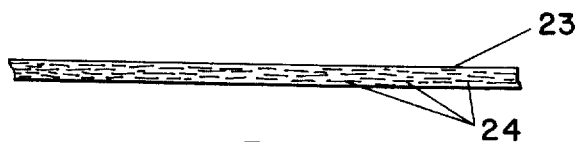
FIG. 3 is a modification showing a porous filter sheet having conductive carbon fibers disposed throughout the sheet.

Although the conductive carbon containing part of the filter element is shown as a sandwich layer in FIG. 2, it is not restricted to this form but may be distributed throughout the filter element as shown in FIG. 3. In this preferred modification a porous fibrous filter element 23 has carbon particles or fibers 24 disposed throughout the element. The carbon particles or fibers are preferably mixed with the fibrous stock at the time the element 23 is being formed. Resins or latexes such as melamine formaldehyde, phenol formaldehyde or similar melamine or phenolic resins may be used to bond the conductive material to the fibers. Regenerated cellulose available in powder form for solution preparation or other cellulosic solutions may be used, depending on the end use of the filter element.

Figure 4:
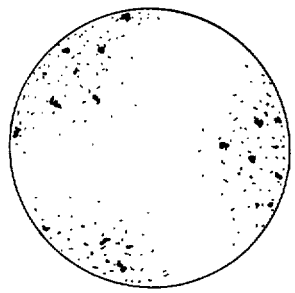
FIG. 4 is a plain view of a filter disc cut from the material of either FIG. 2 or FIG. 3.
Figure 5:
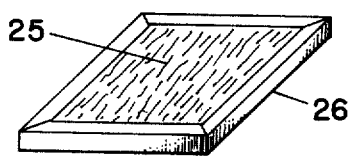
FIG. 5 shows a flat filter element adapted for air or gas filtration.

Filter elements as shown in FIGS. 2 and 3 may be employed in various types of filters. One such filter is shown in FIG. 4 in which the element of either FIG. 2 or FIG. 3 is cut to form the disc shown, which may be secured in the desired filtering position to act as a surface type filter. Another modification is shown in FIG. 5 in which the element 25 is made of a more loosely felted fiber batt, adapted for air or gas filtration, with the fibrous element being supported in a metal frame 26.

Figure 6:
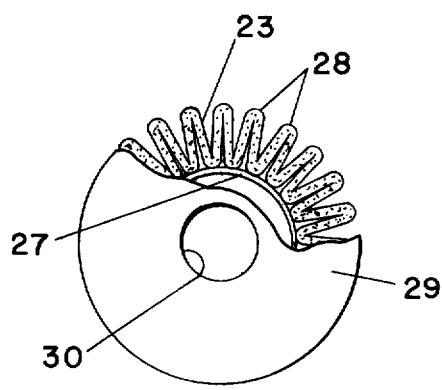
FIG. 6 is a top plain view with part broken away of a pleated liquid filter.
Figure 7:
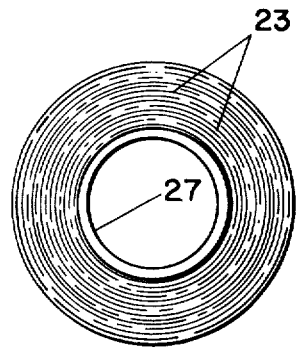
FIG. 7 is a horizontal sectional view through a cylindrical filter formed by wrapping a sheet of filter material spirally about a central core.
Figure 8:
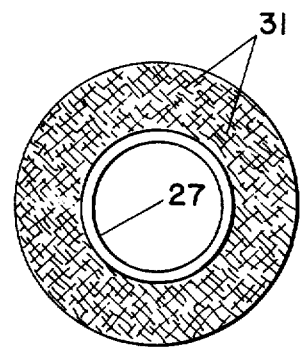
FIG. 8 is a top plan view of a molded filter.

The filter elements as shown in FIG. 2 or FIG. 3 may also be employed to form a pleated filter element as shown in FIG. 6 where the filter element 23 is pleated as indicated at 28 and the pleats are arranged in the form of an annulus about a perforated center tube 27. The filter construction thus formed is preferably provided with end caps 29 which are bonded to the opposite ends of the element 28, such end caps having a center hole 30 to receive the usual filter support. A similar type of construction is shown in FIG. 7 in which the filter element 23 is wound spirally upon itself around a perforated center tube 27 to form a filter cartridge. Alternatively, the cartridge may be formed by winding a yarn or roving of a conductive fiber or mixture of fibers in a Honeycomb pattern on center tube 27, or the cartridge may be formed from a molded or vacuum formed cylindrical mass of fibers 31 as shown in FIG. 8.

In all of the constructions described, the carbon particles or fibers are distributed throughout the filter element in such a manner as to insure electrical conductivity throughout the element. The element is then grounded through the end caps as shown for a filter cartridge in FIG. 9. In this figure, a cartridge made as in FIGS. 6, 7 or 8 is shown with end caps 29. These end caps are of any suitable metal and are joined to the filter elements 23 by a suitable sealing composition 32. Since most sealing compositions are resinous in nature and nonconductive, they must be blended with a sufficient amount of finely divided carbon to provide an electrically conductive bond between the filter elements 23 and the end caps 29. The end caps are then grounded as indicated by electrical connection 33. This ground is usually supplied by the metal filter housing in contact with the end caps so that only special cases would require a separate ground connection to the filter elements. The invention is not limited to filter cartridges having end caps however, since most of the wound Honeycomb and felted (vacuum formed) filter cartridges are made without end caps. These would be grounded through the metal ends of the filter housing. The conductive filter elements of the invention therefor provide a method for the dissipation of static charges that may rapidly build up in the pores of nonconductive filter media. This eliminates the hazard of high static electrical charge accumulations that may cause sparking across the filter media and ignition or explosion of flammable filter fluids or fluid mixtures.

While the conductive filter elements of the invention have been described in reference to their utility for removing static charges, the invention is not restricted to this use alone. In many filtration applications, an electrical charge of relatively low potential in the pores of the filter element enhances the separation effect. This is especially true if the particles removed are of opposite charge to that on the filter element. This allows the element to function throughout its depth, rather than restricting particle removal to the surface of the element. The conductive filter elements of the invention permit the maintenance of a controlled charge of low potential throughout the filter, the charge being either positive or negative if direct current is used. The power source may also be alternating current, varying in frequency from about 2 to about 60 cycles per second, with the preferred range being 2 to 20 cycles per second. High potentials, such as those used in electrostatic precipitators are avoided, since the filter element of the invention employs relatively low potentials.

Figure 9:
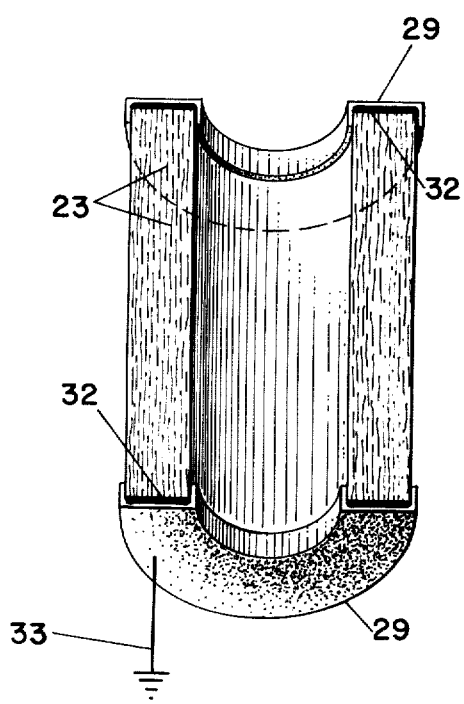
FIG. 9 is a lengthwise sectional view of a grounded filter cartridge.
Figure 10:
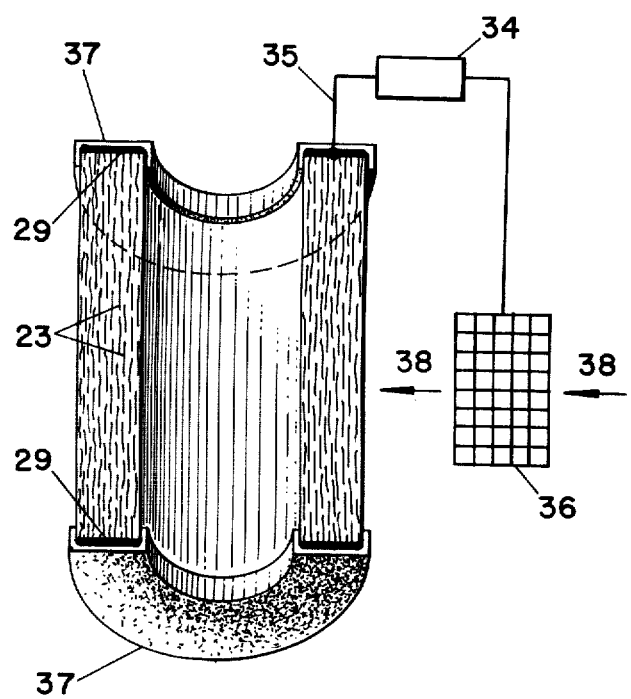
FIG. 10 shows the cartridge of FIG. 9 with controlled external power circuit. No grounding circuit is used with this modification.

The use of low voltage potential in connection with a conductive filter element of the invention is shown in FIG. 10 in which a cartridge, similar to that of FIG. 9 has been modified to permit the maintenance of a controlled charge within the conductive filter element 23. Metal end caps 29 are used to make electrical contact with the filter element 23, the caps are connected to an external power source 34 by the conductor 35. Current potentials ranging from about 0.001 to about 100 volts may be used and the charge on the filter element may be either positive or negative, or may alternate between these, depending on the power source and the charge carried by the particles in the filter fluid stream. These particles may be charged by suspending metal grids 36 in the fluid at a distance upstream from the filter, the grids then being connected to the opposite pole of the power source 34. The direction of fluid flow is shown by arrows 38. The end caps 37 must be of plastic or a similar insulating material to prevent the grounding of the filter cartridge and the loss of the controlled potential.

Figure 11:
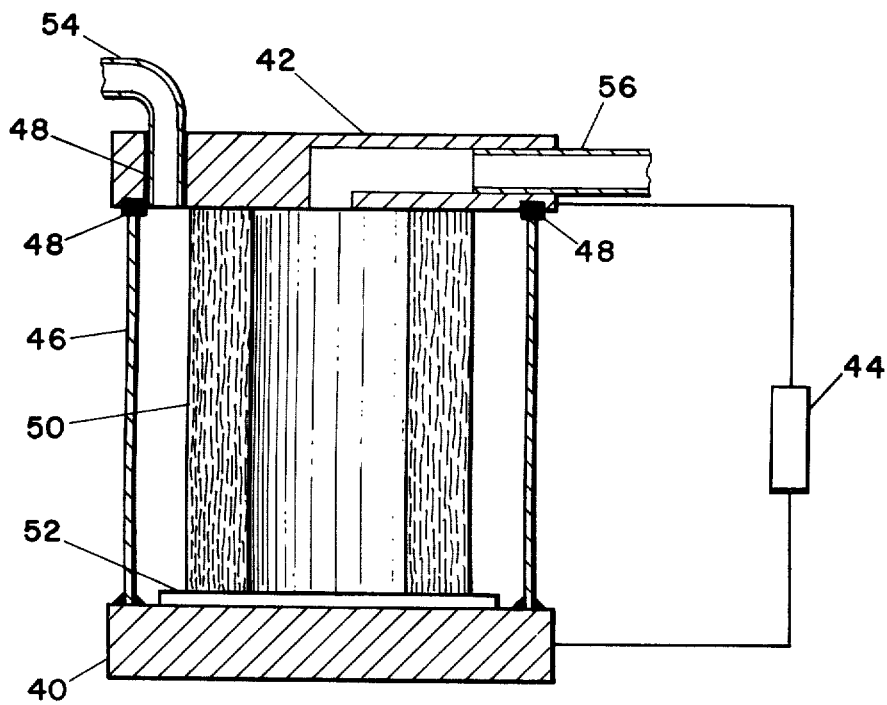
FIGS. 11 and 13 are lengthwise sectional views of filter assemblies containing filter cartridges without end caps and having external power sources for charging the cartridges.

The invention is not limited to filter cartridges having end caps however, but may also be used with cartridges made without end caps. An assembled filter unit of this type is shown in FIG. 11. Both the bottom filter housing end cap 40 and the top housing end cap 42 are of conductive material and are connected to opposite poles of a power source 44. The outer cylindrical shell 46 is made of conducting material which may be a suitable metal or plastic with metal laminations. The circular insulating gasket 48 prevents electrical flow directly between the two housings. The conductive filter element 50 is held in electrical contact with the top filter housing 42 and is insulated from the bottom housing 40 by the basket 52. The upper filter housing 42 contains a fluid inlet 54 and filtrate discharge 56, the filter assembly being held together by appropriate closure means, not shown in the figure. It should be emphasized that grounding is not desired when the filter elements have controlled charges from external power sources. Special housings must be used, the housings being insulated electrically from the pipe or tubing carrying the fluid and filtrate into and from the filter housings. Nonconductive materials such as rubber or plastic may be used for this purpose.

Figure 13:
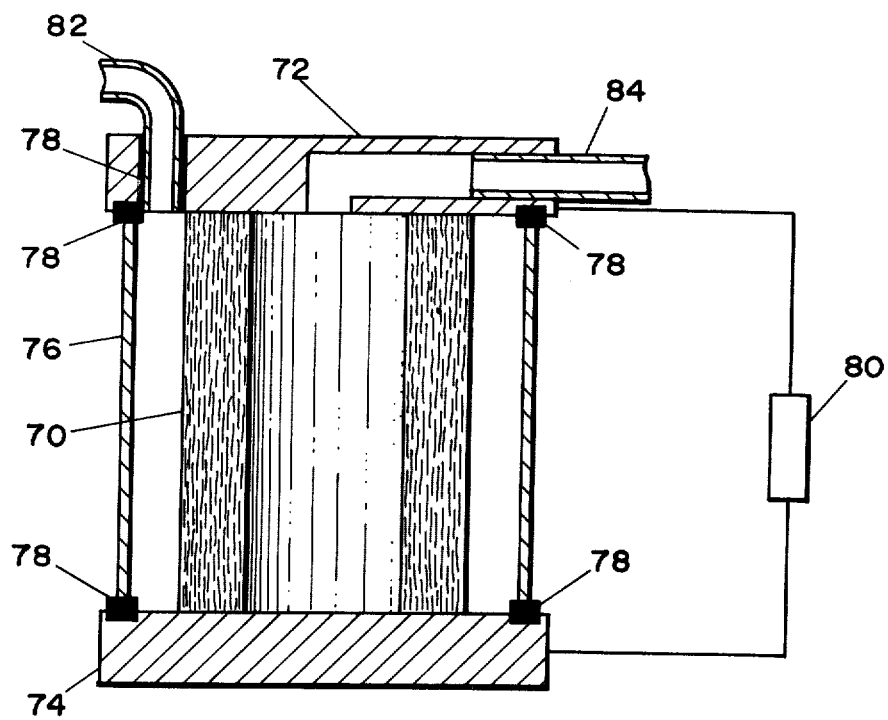

In some filtration applications, the filter element may function more effectively if it is made part of a closed electrical circuit. An assembled filter unit of this type is shown in FIG. 13. This is similar to the assembly shown in FIG. 11 wherein a conductive filter element is held between two electrically conductive filter housings. In FIG. 13, the filter element 70 is held in electrical contact with top filter housing 72 and lower housing 74. The outer cylindrical shell 76 is made of a nonconductive material or, if conductive, is insulated from both filter housings by circular insulating gaskets 78. The power source 80 is connected to the filter housings to allow a flow of current from the power source through the conductive filter element 70 and back to the power source, this flow being either direct or alternating current as desired. The upper filter housing 72 contains a fluid inlet 82 and filtrate discharge 84, the filter assembly being held together by closure means not shown in the figure. Since a controlled electrical charge, as described previously, is used in this filter, grounding must be avoided.

While the filter elements of the invention have been described by reference to materials in the fibrous state, the invention is not restricted to these but may also be applied to bed type filters using particulate filter media such as sand, coal granules, glass beads, Tripoli and Fullers Earth or similar diatomaceous earths. These normally nonconductive media may be coated or impregnated with carbon and electrified with a low voltage charge. In the filtration of liquids, the particulate material may carry an electrical charge (zeta potential) and this may be equaled by an opposite charge applied to the filter bed so that particles down to and including colloidal sizes are removed.

Figure 12:
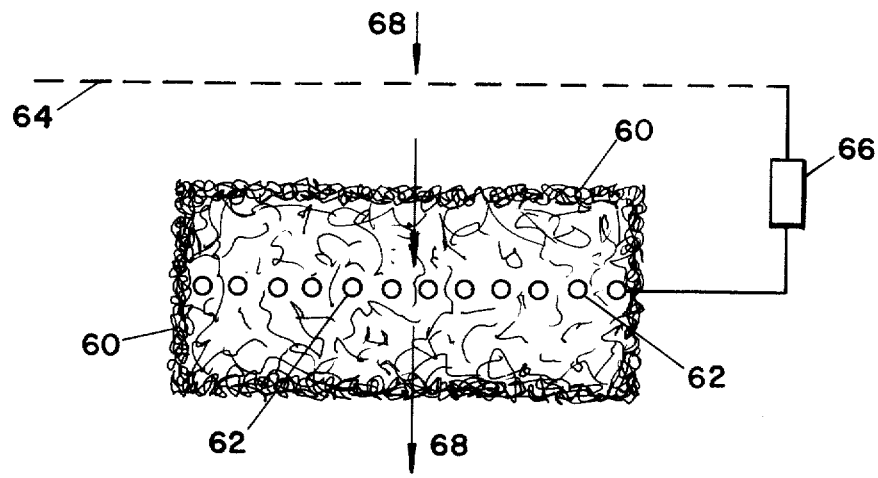
FIG. 12 is a sectional side view of a filter bed, charged by an external power source.

A filter element of this type is shown in FIG. 12 in which the conductive filter bed material 60 contains a network, screen or rod electrode 62 while a similar type of electrode 64 is positioned a short distance from the surface of the filter bed. The two electrodes are connected to an external power source 66 which may furnish a potential ranging from about 0.001 to about 100 volts. Fluid flow, as shown by arrows 68, passes through electrode 64 before entering the filter element 60 which has an opposite charge. As in the charged elements previously described, the filter bed and electrodes must be insulated to prevent grounding and resultant dissipation of the controlled filter charge.

What is claimed is:

1. A filter element, said filter element including:
   a. a fluid permeable body composed of electrically conductive carbonaceous material disposed throughout said body for defining an electrical pathway therethrough;
   b. an external terminal means; and
   c. electrical conductive means in electrical contact with said carbonaceous material and with said external terminal means for defining an electrical pathway there between.

2. A filter element according to claim 1 in which the electrically conductive carbonaceous material comprises finely divided carbon.

3. A filter element according to claim 1 in which the said electrically conductive carbonaceous material comprises carbon fibers.

4. A filter element according to claim 1 in which the external terminal means is an electrical ground.

5. A filter element according to claim 1 in which the external terminal means is an electrical power source.

6. A filter assembly comprising:

a. a casing having an inlet and an outlet for fluids, the casing having a supporting and sealing means associated therewith for directing the fluids through a filter element enclosed within the casing; and b. said filter element including a fluid permeable body comprised of electrically conductive carbonaceous material disposed throughout said body for defining an electrical pathway therethrough, an external terminal means, and electrical conductive means in electrical contact with said carbonaceous material and with said external terminal means for defining an electrical pathway therebetween.

7. A filter assembly according to claim 6 in which the carbonaceous conductive material comprises finely divided carbon, and at least one fibrous support means for holding the carbon in fixed location within the assembly.

8. A filter element according to claim 7 in which the fibrous support means contains the conductive carbonaceous material as a fiber filler.

9. A filter assembly according to claim 7 in which the fibrous support means contains the conductive carbonaceous material as a fiber filler.

10. A filter assembly according to claim 6 in which the electrically conductive carbonaceous material comprises carbon fibers.

11. A filter assembly according to claim 6 in which the external terminal means is an electrical ground.

12. A filter assembly according to claim 6 in which the external terminal means is an electrical power source.

* * * * *

UNITED STATES PATENT OFFICE
CERTIFICATE OF CORRECTION

PATENT NO. : 3,933,643
DATED : January 20, 1976
INVENTOR(S) : Floyd E. Colvin, John R. Mummert and Franklin G. Gilbert It is certified that error appears in the above-identified patent and that said Letters Patent are hereby corrected as shown below:

Column 6, line 49, "composed" should read --comprised--.

Signed and Sealed this

Fourth Day of April 1978

[SEAL]

Attest:

RUTH C. MASON
Attesting Officer

LUTRELLE F. PARKER
Acting Commissioner of Patents and Trademarks